May 15, 1945. J. E. NOGLE 2,376,001
EQUALIZING TRAILER HITCH
Filed Dec. 2, 1944 2 Sheets-Sheet 1
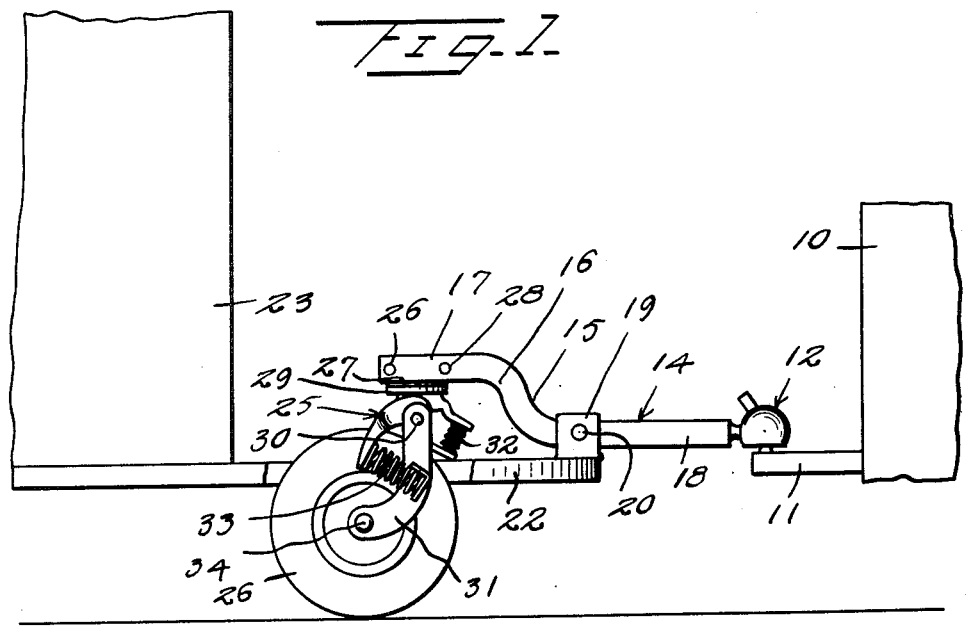
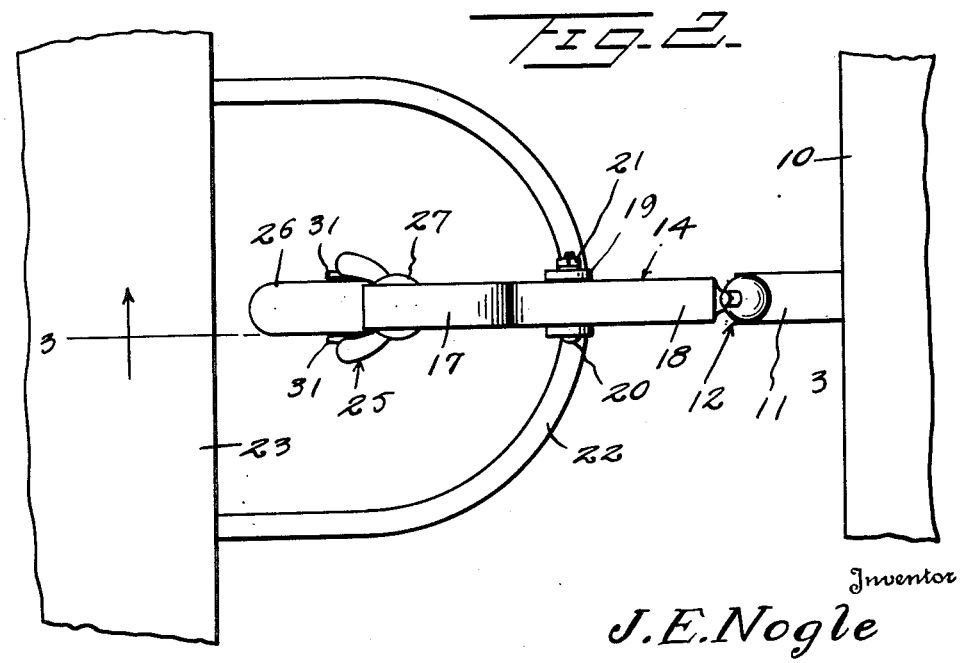
Inventor
J. E. Nogle
By Randolph & Beavers
Attorneys May 15, 1945. J. E. NOGLE 2,376,001
EQUALIZING TRAILER HITCH
Filed Dec. 2, 1944 2 Sheets-Sheet 2
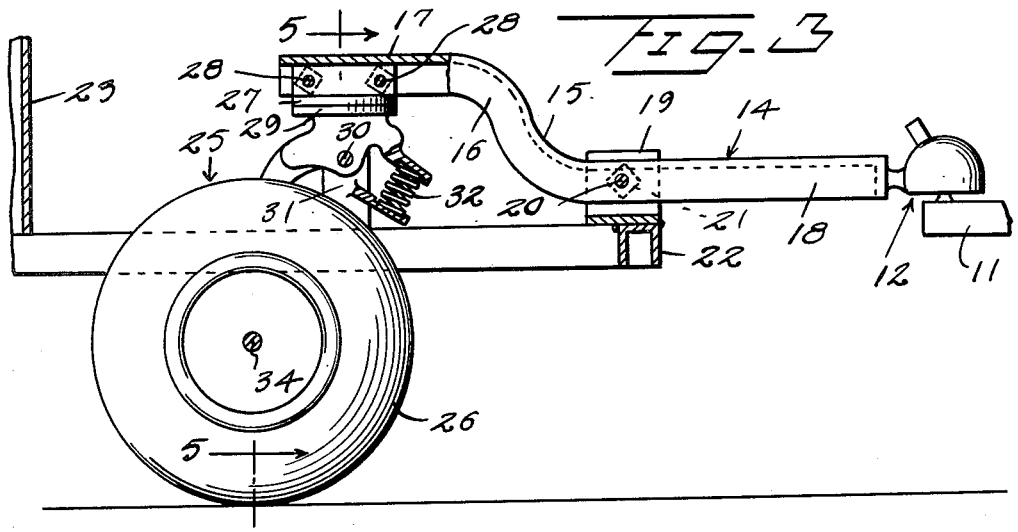
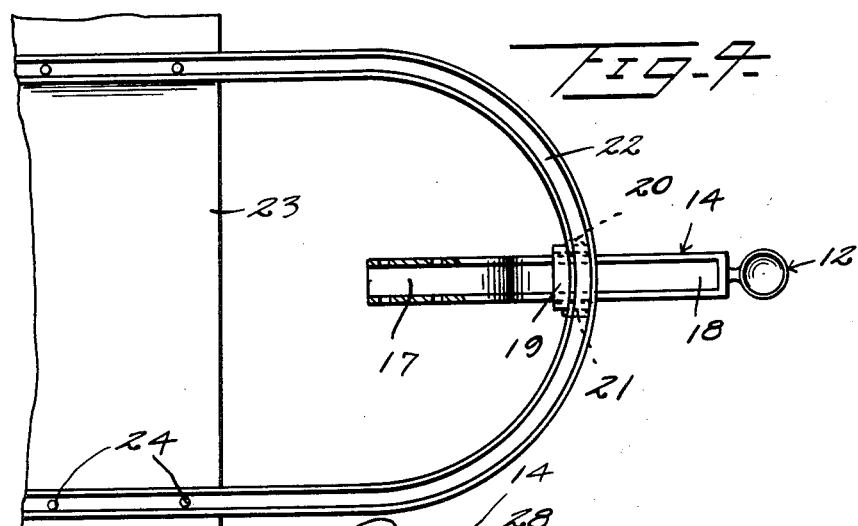
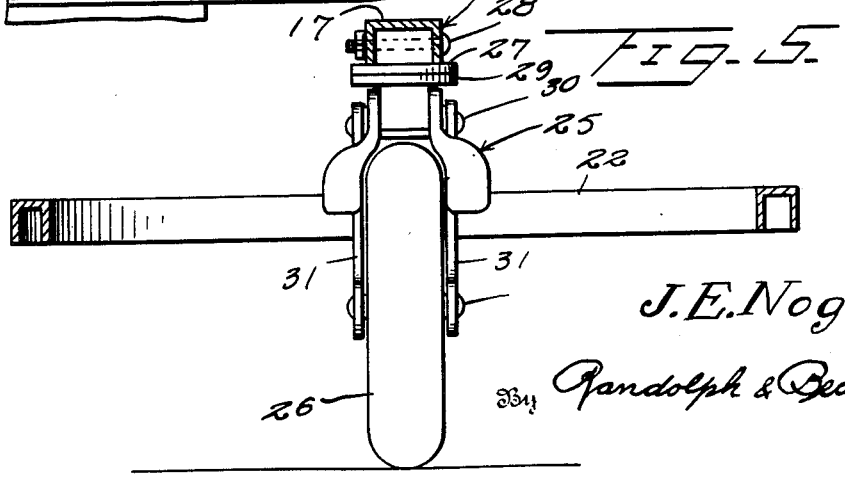
Inventor
J. E. Nogle
By Randolph & Beavers
Attorneys Patented May 15, 1945

2,376,001

UNITED STATES PATENT OFFICE 2,376,001

EQUALIZING TRAILER HITCH

James E. Nogle, Jacksonville Beach, Fla.

Application December 2, 1944, Serial No. 566,260

6 Claims. (Cl. 280—33.4)

This invention relates generally to hitch devices for coupling trailers to towing vehicles therefor and more particularly to an equalizing trailer hitch of this general character in which a relatively large, knee action type third wheel support for the trailer may be employed and mounted with respect to the hitch in such a manner that the third wheel is caused to assume substantially one half the weight of the trailer which otherwise is supported entirely by the towing vehicle and the third wheel is free to rise and fall yieldably as obstacles and chuck holes in the roadway are encountered thereby, the towing vehicle in such latter case supporting substantially the entire load whereby up and down movement of the trailer is obviated and the trailer moves smoothly along the road.

An important feature of the invention resides in the provision of a third wheel support of relatively large diameter whereby the wheel is caused to make relatively few revolutions as the trailer traverses a given distance. This is advantageous, of course, for the reason that small diameter wheels, as employed in the prior art hitches for the purpose herein, necessarily must revolve at greater speeds and make more revolutions in order to traverse the same distance, thus subjecting the small diameter wheels to premature tire wear and failure and bearing failure due to the heat generated.

Another feature of the invention is directed to the provision of a wheel supported trailer hitch or dolly in which a single third wheel support of the caster type is employed whereby backing up movement of the trailer is facilitated in contradistinction to the two wheel type of dollies as employed in the prior art hitches wherein a jack-knifing action of the hitch occurs when a backing up operation is attempted and a system of guide lines, or the like, necessarily is resorted to as an expedient for making the dollies track.

Still other features and advantages of the invention are those inherent in or implied from the novel construction, combination and arrangement of parts as will become more clearly apparent as the description proceeds, reference being had to the accompanying drawings in which:

Figure 1 is a view in elevation of a trailer hitch constructed in accordance with a preferred embodiment of the invention and illustrates the manner of coupling a trailer to a towing vehicle therefor, Figure 2 is a plan view of the trailer hitch disclosed in Figure 1, Figure 3 is a somewhat enlarged view in elevation of the trailer hitch as seen along the line 3—3 of Figure 2, Figure 4 is a bottom plan view of the trailer hitch with the wheel support removed therefrom, and Figure 5 is a sectional view of the trailer hitch taken substantially along the line 5—5 of Figure 3, certain parts being shown in elevation.

Referring now to the drawings for a more detailed description of the invention, 10 designates a towing vehicle having a suitable rearward extension 11 which carries the ball portion, not shown, of a conventional ball and socket type of universal joint connection generally designated 12, the socket of which is secured to the weight equalizing hitch member 14 in any convenient manner.

Hitch member 14 preferably is formed of U-channel iron to form a rigid structure, particularly through the bends 15 and 16 formed therein whereby the rear end portion 17 of the hitch member is offset upwardly from the front end portion 18 thereof for a purpose hereinafter to be explained.

Hitch member 14 is slidably received into an inverted U-shaped member 19 and is pivotally secured thereto for limited rocking movement in a vertical plane about the horizontally disposed bolt 20 carried by member 19 and secured thereto as by the nut 21, member 19 in turn being welded, or otherwise suitably secured to, a U-shaped hitch member 22, also preferably formed of U-channel iron.

Hitch member 22 conveniently is secured to a trailer such, for example, as to the house trailer 23 as by a plurality of bolts 24. Thus, by reason of the hitch arrangement thus far described, the house trailer 23 and the towing vehicle 10 therefor are maintained at substantially the same level above the ground when hitch members 14 and 22 extend generally parallel to each other. However, by reason of the offset portion 17 of hitch member 14 and the U-shape of hitch member 22, it is possible to employ a third wheel support, generally designated 25, for the hitch, which wheel support comprises a relatively large rubber tire ground engaging wheel 26 which, notwithstanding its size, has ample space for movement between the legs of U-shaped hitch member 22.

The third wheel support 25 may be of any conventional knee action type caster wheel suitable for the purpose such, for example, as the knee action caster wheel disclosed in the patent to Alexis R. Pribil, No. 2,087,299. Suffice it to state herein that such a wheel comprises a bearing block 27 which conveniently may be secured to end portion 17 of hitch member 14 as by bolts 28 and nuts therefor. Bearing block 27 carries the vertical shaft or stem, (not shown) about which the bracket member 29 pivots in the usual manner. Bracket member 29 carries a horizontal shaft 30 upon which fork members 31 are arranged to rock, the rocking movement being limited yieldably by means of forward and rearward recoil springs 31 and 33 disposed between suitable extensions of bracket member 29 and suitable pockets formed on or extensions from the fork members 31. The fork members 31 also carry the spindle 34 upon which the ground engaging wheel 26 is journalled.

In operation, with the parts proportioned substantially as shown, wheel 26 divides the weight of trailer 23 with the towing vehicle 10, the respective weight portions being transmitted to each through pivot 20 which also permits a limited degree of relative rocking movement of hitch members 14 and 22 in a vertical plane, these members otherwise moving as a unit about ball and socket joint 12. Thus, the caster wheel assembly 25 acts as a third wheel support for the house trailer and backward movement thereof is controlled entirely from the ball and socket connection 12, caster wheel 26 turning in accordance with the direction of movement imparted to the trailer from the towing vehicle through connection 12.

Moreover, the knee action character of third wheel 25 provides a flexible partial support for the trailer which will either cause the trailer to be moved upwardly as the wheel engages an obstacle or cause the trailer to sag downwardly as the wheel dips into a chuck hole, or the like.

While but a single embodiment of the invention has been disclosed herein, it is my intention in the claims appended hereto to cover all such further embodiments and variations thereof as in commensurate with the spirit and scope of the invention.

I claim as my invention:

1. In an equalizing hitch for coupling a trailer to a towing vehicle therefor, a U-shaped hitch member secured on the ends thereof to the trailer, an equalizing hitch member secured intermediate the ends thereof to said U-member for rocking movement thereabout in a vertical plane, means comprising a universal joint for connecting said equalizing hitch member to said towing vehicle, and a knee action type caster wheel secured to the opposite end portion of the equalizing member and disposed between the legs of said U-member.

2. In an equalizing hitch for coupling a trailer to a towing vehicle therefor, a U-shaped hitch member secured on the ends thereof to the trailer, an equalizing hitch member secured intermediate the ends thereof to said U-member for rocking movement thereabout in a vertical plane, means comprising a universal joint for connecting said equalizing hitch member to said towing vehicle, and a knee action type caster wheel secured to the opposite end portion of the equalizing member and disposed between the legs of said U-member, said opposite end portion of the equalizing hitch member being offset upwardly whereby said caster wheel secured thereto may comprise a ground engaging wheel of relatively large diameter.

3. In an equalizing hitch for coupling a trailer to a towing vehicle therefor, a U-shaped hitch member secured on the ends thereof to the trailer, an equalizing hitch member having a ball and socket joint on one end thereof for connection to said towing vehicle and having a knee action type caster wheel secured to the other end thereof, and means including a transverse pivot for securing the equalizing hitch member intermediate the ends thereof to said U-shaped member for rocking movement thereabout in a vertical plane whereby the towing vehicle and the caster wheel divide the weight of the trailer substantially equally therebetween.

4. In an equalizing hitch for coupling a trailer to a towing vehicle therefor, a U-shaped hitch member secured on the ends thereof to the trailer, an equalizing hitch member having a ball and socket joint on one end thereof for connection to said towing vehicle and having a knee action type caster wheel secured to the other end thereof, and means including a transverse pivot for securing the equalizing hitch member intermediate the ends thereof to said U-shaped member for rocking movement thereabout in a vertical plane whereby the towing vehicle and the caster wheel divide the weight of the trailer substantially equally therebetween, said other end of the equalizing hitch member being offset upwardly whereby said caster wheel secured thereto may comprise a rubber tire ground engaging wheel of relatively large diameter thereby to prevent premature tire and bearing failure thereof, and said hitch members being formed of channel iron to provide a rigid hitch structure.

5. In an equalizing hitch for coupling a trailer to a towing vehicle therefor, a U-shaped hitch member secured on the ends thereof to the trailer, an equalizing hitch member secured intermediate the ends thereof to said U-member for rocking movement thereabout in a vertical plane extending along the course of travel of the towing vehicle and for movement as a unit therewith in any other direction, means comprising a universal joint for connecting said equalizing hitch member to said towing vehicle, and a knee action type caster wheel secured to the opposite end portion of the equalizing member and disposed between the legs of said U-member.

6. In a trailer dolly of the character disclosed, a length of channel iron having a ball and socket joint secured to one end thereof and being offset upwardly on the other end portion thereof to receive a third wheel support for the trailer, said third wheel support being of a knee action caster wheel type having a ground engaging wheel of relatively large diameter, and means including a longitudinally disposed pivot for connecting said member to the trailer in such a manner that substantially one-half of the trailer weight is supported by said third wheel support and said channel iron serves effectively as a rigid connection between the trailer and a towing vehicle therefor whereby directive movements of the trailer are controlled by the towing vehicle through said ball and socket joint.

JAMES E. NOGLE.